United States Patent [19]
Alkasab

[11] 3,972,316
[45] Aug. 3, 1976

[54] SOLAR ENERGY COLLECTOR WITH MOVING BELT ABSORBER

[75] Inventor: Kalil A. Alkasab, Wheaton, Ill.

[73] Assignee: Universal Oil Products Company, Des Plaines, Ill.

[22] Filed: July 17, 1975

[21] Appl. No.: 596,691

[52] U.S. Cl. .............................. 126/270; 126/271
[51] Int. Cl.² ............................................ F24J 3/02
[58] Field of Search ............ 126/270, 271; 237/1 A; 34/93; 62/2

[56] References Cited
UNITED STATES PATENTS

| | | | |
|---|---|---|---|
| 1,678,711 | 7/1928 | Shipman | 126/270 X |
| 2,553,073 | 5/1951 | Barnett | 126/271 |
| 3,823,703 | 7/1974 | Lanciault | 126/271 |
| 3,894,345 | 7/1975 | Zeltmann | 126/270 X |

Primary Examiner—Kenneth W. Sprague
Attorney, Agent, or Firm—James R. Hoatson, Jr.; Barry L. Clark; William H. Page, II

[57] ABSTRACT

Solar energy collection device uses a motor driven moving endless belt absorber member which is mounted in a glass covered collector housing so as to present a flat plate configuration to the solar rays. The moving belt progressively increases in temperature as it passes through the housing, and is guided, after it is heated, to a heat transfer chamber outside the main collector housing where its heat can be transferred to a suitable heat transfer fluid.

8 Claims, 3 Drawing Figures

SOLAR ENERGY COLLECTOR WITH MOVING BELT ABSORBER

BACKGROUND OF THE INVENTION

The invention relates to solar energy collectors and particularly to the type of collector commonly referred to as a flat plate collector wherein a flat, heat absorbing plate is mounted in an insulated chamber and covered by a single or double panel of glass. Such conventional collectors generally are fairly expensive in that they commonly utilize copper panels to which copper tubing is attached, such as by brazing, as an absorbing surface. Such collectors are also of limited efficiency since significant energy is lost through the housing and glass due to conduction and re-radiation losses resulting from the large temperature differential that exists between the stationary absorber plate and the ambient. A further deficiency of conventional flat plate collectors relates to the problems caused by the use of water as a heat transfer fluid. The requirement for pumps is a significant expense while freezing and pipe expansion due to varying temperatures can cause damage to the piping system and portions of a building subjected to any leaks in the piping. Corrosion of the tubing can also be a problem which can shorten the life of a collector and produce damage while the collection of moisture on the glass covers can decrease the efficiency of energy collection.

SUMMARY

It is among the objects of the present invention to provide an improved solar energy collector which will be more efficient and less expensive than presently available collectors.

These and other objects are achieved by the solar energy collector of the present invention which incorporates an absorber surface in the form of a moving belt. By mounting the moving belt absorber on a plurality of rollers and a driving shaft so that it continually carries heat out of the collector housing into a separated heat exchange comparatment, the heat loss by re-radiation to the atmosphere is considerably reduced.

In a preferred embodiment, the heat transfer fluid contacting the moving belt absorber within the heat exchange compartment is air. Although the air must be moved, the expense of doing so is considerably less than pumping a liquid. By using air, the problems of freezing, leaks, and moisture on the cover glass are eliminated. The belt is preferably made of reinforced rubber or other flexible heat absorbing material. Although the belt can be driven at a constant speed, it is preferable that the speed be adjustable so that one can select an appropriate speed between the faster ones which would produce greater total heat transfer and slower ones which would produce heat transfer at higher temperatures. Controls are also provided, of course, to stop the movement of the belt when the temperature of the absorbing surface is less than a desired minimum. Appropriate seals between the belt and the heat exchange compartment serve to prevent excessive leakage of air into the collector housing.

In a modified form of collector, a liquid such as water can be used as the heat exchange compartment. The liquid contacts the moving belt and extracts heat therefrom, which heat can then be transferred to a finned, liquid containing tube immersed in the liquid which will carry it to a heat storage tank, for example. Even though liquid is used as a heat transfer medium, it does not present the freezing problems associated with liquid passing through tubes on the surface of a conventional flat plate collector since it is contained within an insulated heat exchange compartment in association with a heat storage tank. By the use of appropriate seals and wipers the liquid can be substantially completely removed from the belt before it returns to the collector housing. However, some moisture might still be retained which could produce some condensation on the glass cover plate.

DESCRIPTION OF THE PREFERRED EMBODIMENT

Figure 1:
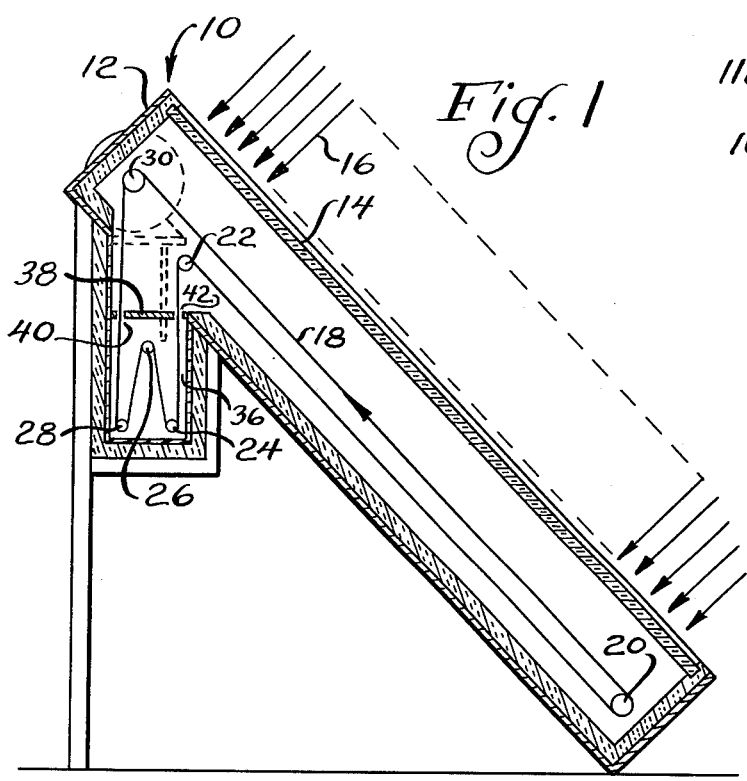
FIG. 1 is a sectional side view of the collector.

Referring to FIG. 1, the solar collector indicated at 10 comprises a housing 12 which may be formed of a suitable material such as wood or plastic covered with metal. The housing 12 defines a energy collection chamber 13 which is closed on one side by a panel of glass 14 through which solar rays 16 enter the collector and impinge upon the surface of moving belt member 18. The moving belt 18 is formed of fabric reinforced rubber or other suitable material and is preferably black to increase its absorptivity. The belt 18 is guided around a plurality of guide rollers 20, 22, 24, 26, and 28 and a driving roller 30 which is driven by a motor 32 mounted on a support bracket 34 attached to the housing 12. A heat exchange compartment 36 is integrally attached to the housing 12 and separated from chamber 13 by a partition member 38 having apertures 40, 42 which permit the moving belt 18 to move in and out of the compartment 36.

Figure 2:
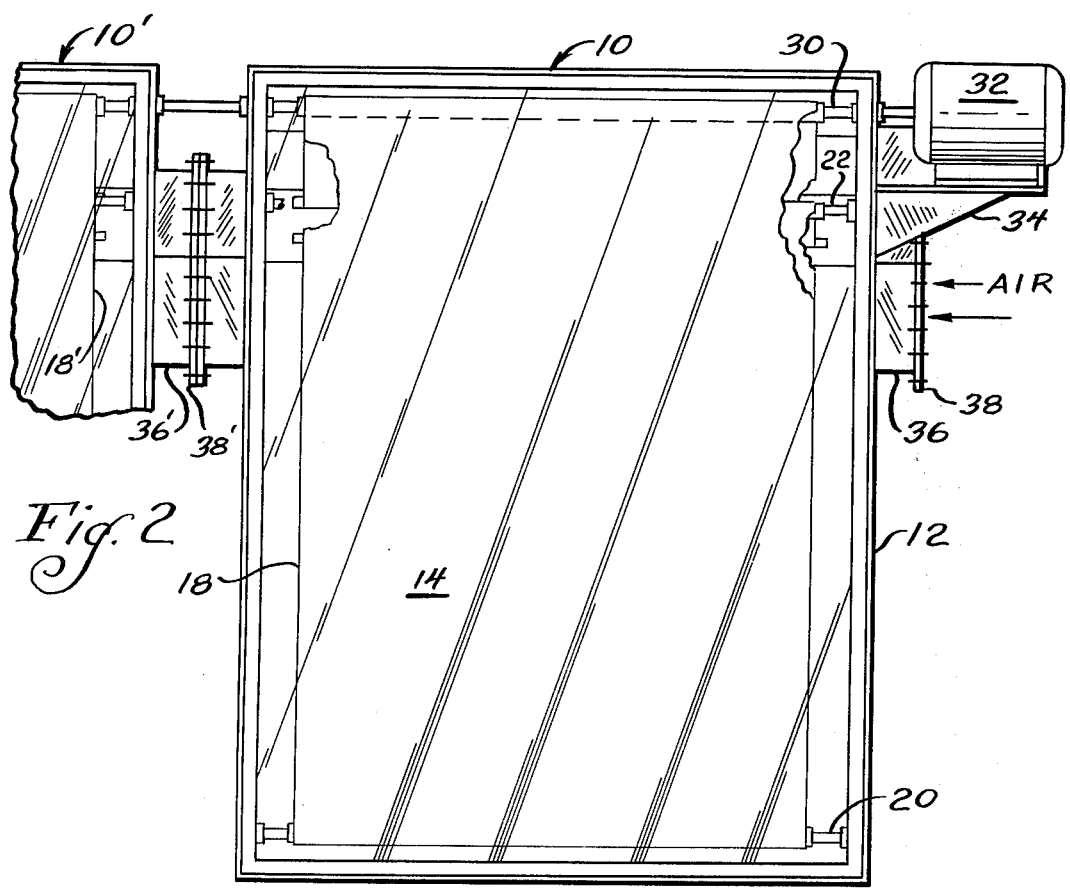
FIG. 2 is a top view of the collector of FIG. 1.

Preferably, a plurality of units 10,10' are positioned side by side as indicated in FIG. 2 so that the moving belts 18,18' can be rotated by a single drive roller 30. The heat exchange compartments 36,36' preferably include flange portions 38,38' which permit a plurality of collectors 10,10' to be arranged in series so that the air may be circulated through the compartments 36,36' as indicated by the arrows in FIG. 2.

Figure 3:
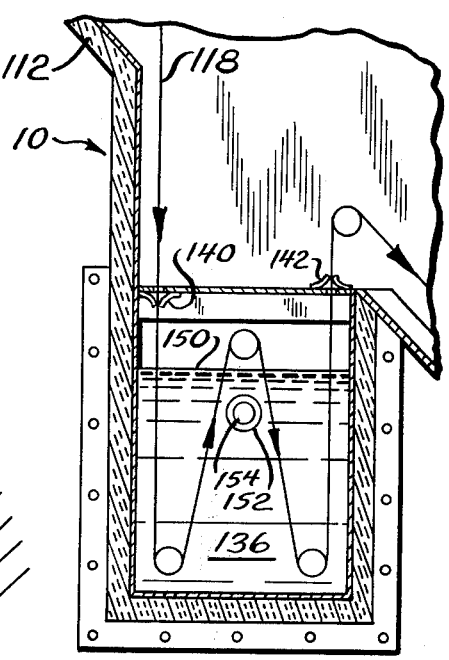
FIG. 3 is a fragmentary sectional side view of a modified collector.

FIG. 3 illustrates a modification of the embodiment of FIGS. 1 and 2. In this collector 110, the heat transfer compartment 136 is closed except for the apertures formed by seals or wipers 140, 142 and is adpated to be filled with liquid 150. The liquid 150 receives the heat absorbed by moving belt 118 and transfers it to a circulating liquid fowing through the inside 154 of a heat exchange tube 152. The seals or wipers 140, 142 help insulate the heat exchange compatment 136 and also, in the case of exit wiper 142, wipe water from the belt 118 so as to minimize the opportunity for condensation on the inside of the glass panel which covers the housing 112. If desired, a plurality of units 110 can be positioned so that tube 152 will pass through each of them.

I claim as my invention.

1. A solar energy collection apparatus comprising a housing forming an energy collection chamber, a belt-like absorption member mounted for movement within said housing, a plurality of guide members for mounting said absorption member in said housing, a heat exchanger carried by said housing and located remotely from said collection chamber, a plurality of guide members for mounting said absorption member in said heat exchanger and cooperating with the guide members in the housing for permitting the absorption member to continuously travel from the housing to the heat exchanger and back to the housing, and drive means for driving said absorption member.

2. The apparatus of claim 1 wherein a plurality of said housings are positioned in predetermined relation to each other, said drive means driving all of said absorption members simultaneously.

3. The apparatus of claim 2 wherein the heat exchangers carried by each of said housings are connected to each other in heat exchange relation.

4. The apparatus of claim 1 wherein said heat exchanger contains air as a heat exchanger medium.

5. The apparatus of claim 1 wherein said heat exchanger contains liquid as a heat exchange medium.

6. The apparatus of claim 5 wherein heat exchange tubing is positioned within said liquid heat exchanger medium.

7. The apparatus of claim 3 wherein said heat exchangers contain air as a heat exchange medium.

8. The apparatus of claim 7 wherein the energy collection chambers are covered with glass and the heat exchangers are sealed relative to the collection chambers to minimize the leakage or air therebetween while permitting passage of said absorption members.

* * * * *